United States Patent
Lieber et al.

(10) Patent No.: US 12,069,380 B2
(45) Date of Patent: Aug. 20, 2024

(54) SOLAR BLIND IMAGING

(71) Applicant: NEC Corporation Of America, Herzlia (IL)

(72) Inventors: Aaron Mark Lieber, Rishon le Zion (IL); Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 251 days.

(21) Appl. No.: 17/689,109

(22) Filed: Mar. 8, 2022

(65) Prior Publication Data
US 2023/0292013 A1 Sep. 14, 2023

(51) Int. Cl.
| | |
|---|---|
| *H04N 23/75* | (2023.01) |
| *G06N 20/00* | (2019.01) |
| *G06V 10/22* | (2022.01) |
| *G06V 10/74* | (2022.01) |
| *G06V 20/20* | (2022.01) |
| *G06V 20/50* | (2022.01) |
| *G06V 20/62* | (2022.01) |
| *G06V 40/10* | (2022.01) |
| *H04N 23/56* | (2023.01) |

(52) U.S. Cl.
CPC ............ *H04N 23/75* (2023.01); *G06N 20/00* (2019.01); *G06V 10/22* (2022.01); *G06V 10/74* (2022.01); *G06V 20/20* (2022.01); *G06V 20/50* (2022.01); *G06V 20/625* (2022.01); *G06V 40/10* (2022.01); *H04N 23/56* (2023.01)

(58) Field of Classification Search
CPC ......... H04N 23/75; G06N 20/00; G06V 20/20
See application file for complete search history.

(56) References Cited

U.S. PATENT DOCUMENTS

| | | | |
|---|---|---|---|
| 6,215,519 B1 | 4/2001 | Nayar et al. | |
| 9,196,056 B2 * | 11/2015 | Hall | ................... G06V 40/10 |
| 10,972,655 B1 | 4/2021 | Ostap et al. | |
| 2010/0322471 A1 | 12/2010 | Treado et al. | |
| 2016/0086018 A1 * | 3/2016 | Lemoff | ................ G06V 40/173 382/118 |
| 2019/0095721 A1 | 3/2019 | Ion et al. | |

(Continued)

FOREIGN PATENT DOCUMENTS

| | | |
|---|---|---|
| CA | 2729712 | 12/2009 |
| EP | 3547277 | 10/2019 |

(Continued)

OTHER PUBLICATIONS

Minaee et al. "Deep-Emotion: Facial Expression Recognition Using Attentional Convolutional Network", ArXiv Preprint ArXiv:1902. 01019v1, p. 1-8, Feb. 4, 2019.

(Continued)

*Primary Examiner* — Hugh Maupin

(57) ABSTRACT

There is provided a system for imaging of a scene, comprising: at least one short wave infrared (SWIR) illumination element that generates SWIR illumination at a SWIR wavelength range, at least one filter that filters out electromagnetic radiation at wavelengths which are mostly non-absorbed by water vapor in air depicted in the scene, and at least one SWIR sensor that captures the SWIR illumination of the SWIR wavelength range which is passed by the at least one filter and generates at least one SWIR image of the scene.

24 Claims, 9 Drawing Sheets

(56) References Cited

U.S. PATENT DOCUMENTS

| | | |
|---|---|---|
| 2020/0309688 A1 | 10/2020 | Park et al. |
| 2021/0275084 A1* | 9/2021 | Tversky ............... A61B 5/0077 |
| 2022/0003665 A1* | 1/2022 | Swenson ............ G01N 21/3504 |
| 2022/0057519 A1* | 2/2022 | Goldstein ............... G01S 17/88 |
| 2022/0095923 A1 | 3/2022 | Seybold et al. |
| 2023/0247313 A1 | 8/2023 | Paris et al. |
| 2023/0288618 A1 | 9/2023 | Lev et al. |
| 2023/0290000 A1 | 9/2023 | Lev et al. |
| 2023/0290181 A1 | 9/2023 | Lieber et al. |
| 2023/0292015 A1 | 9/2023 | Hoch |
| 2023/0326253 A1* | 10/2023 | Shishido .............. G06V 40/166 348/77 |

FOREIGN PATENT DOCUMENTS

| | | |
|---|---|---|
| ES | 2554549 | 12/2015 |
| SG | 191452 | 7/2013 |
| WO | WO 2008/129552 | 10/2008 |
| WO | WO 2011/101856 | 8/2011 |

OTHER PUBLICATIONS

Official Action Dated Apr. 3, 2024 from the US Patent and Trademark Office Re. U.S. Appl. No. 17/741,476. (26 pages).

Steiner et al. "Design of an Active Multispectral SWIR Camera System for Skin Detection and Face Verification", Safety and Security Research Institute (ISF), Bonn-Rhein-Sieg University of Applied Sciences, Grantham-Allee 20, 53757 Sankt Augustin, Germany, Hindawi Publishing Corporation, vol. 2016 | Article ID 9682453, 1-16, Nov. 16, 2015.

Official Action Dated Jan. 30, 2024 From the US Patent and Trademark Office Re. U.S. Appl. No. 17/872,086. (16 Pages).

Notice of Allowance Dated May 1, 2024 from the US Patent and Trademark Office Re. U.S. Appl. No. 17/741,476. (11 pages).

* cited by examiner

# SOLAR BLIND IMAGING

FIELD AND BACKGROUND OF THE INVENTION

The present invention, in some embodiments thereof, relates to imaging sensors and, more specifically, but not exclusively, to systems and methods for capturing images in environments with variable lighting.

Lighting affects images. Good lighting may result in high quality images, while poor lighting significantly reduces the quality of the images. For example, insufficient light, such as at night and/or during cloudy days, results in image with lower quality. In response, images may be taken with strong artificial lighting, or waiting until the sun shines as needed. In another example, Glare from light sources creates a problem when capturing images by a camera. Glare, which is created by light reflecting off an object, distorts the image, for example, creating a bright spot in the image which may make it difficult to recognize people. Glare is avoided, for example, by repositioning the camera and/or reorienting the person whose picture is being taken.

SUMMARY OF THE INVENTION

According to a first aspect, a system for imaging of a scene, comprises: at least one short wave infrared (SWIR) illumination element that generates SWIR illumination at a SWIR wavelength range, at least one filter that filters out electromagnetic radiation at wavelengths which are mostly non-absorbed by water vapor in air depicted in the scene, and at least one SWIR sensor that captures the SWIR illumination of the SWIR wavelength range which is passed by the at least one filter and generates at least one SWIR image of the scene.

According to a second aspect, a method of imaging of a scene with glare, comprises: generating SWIR illumination at a SWIR wavelength range, filtering out electromagnetic radiation at wavelengths which are mostly non-absorbed by water vapor in air depicted in the scene, capturing the SWIR illumination of the SWIR wavelength range which is passed by the filtering, and generating at least one SWIR image of the scene from the captured SWIR illumination.

According to a third aspect, a system for analyzing images of a target object, comprises: at least one short wave infrared (SWIR) illumination element that generates SWIR illumination at a solar blind range for illumination of the target object, at least one SWIR sensor that captures at least one SWIR image of the target object illuminated at the solar blind range, and a non-transitory medium storing program instructions, which, when executed by a processor, cause the processor to analyze the at least one SWIR image to compare the target object to a reference object, and output an indication of whether the target object matches the reference object.

In a further implementation form of the first, second, and third aspects, the at least one filter comprises a spectral narrow pass-band filter that passes wavelengths of about 1350-1450 nanometers (nm) and excludes wavelengths over about 1450 nm and below about 1350 nm.

In a further implementation form of the first, second, and third aspects, the at least one filter comprises a spectral narrow pass-band filter that passes wavelengths of about 1360 nm-1380 nm and excludes wavelengths over about 1380 nm and below about 1360 nm.

In a further implementation form of the first, second, and third aspects, further comprising a non-transitory medium storing program instructions, which, when executed by a processor, cause the processor to analyze the at least one SWIR image to compare a target object depicted in the SWIR image to a reference object depicted in a reference image, and output an indication of whether the target object matches the reference object.

In a further implementation form of the first, second, and third aspects, the target object comprises a part of a human body, and the comparison comprises a biometric verification that the target part of the human body matches a reference part of the human body.

In a further implementation form of the first, second, and third aspects, the target object comprises clothing and/or accessories worn by a subject, and the comparison comprises a re-identification that the clothing and/or accessories matches a reference clothing and/or accessories of the subject.

In a further implementation form of the first, second, and third aspects, further comprising a location sensor that generates an indication of a location, and wherein compare comprising compare the target object with a target location generated by the location sensor to the reference object associated with a reference location.

In a further implementation form of the first, second, and third aspects, further comprising when the target object is a mismatch with the reference object, detecting at least one mismatch between the target object and the reference object, and providing an indication of at least one region of the target object depicting the at least one mismatch.

In a further implementation form of the first, second, and third aspects, further comprising adapting a position and/or orientation of the target object to obtain an adapted target object, and comparing the adapted target object to the reference object.

In a further implementation form of the first, second, and third aspects, the reference object comprises a reference vehicle with a reference license plate detected from a reference SWIR image, and compare comprises comparing a target vehicle with a target license plate from a target SWIR image obtained after the reference SWIR image, and the indication is generated when at least one of: (i) the target license plate matches the reference license plate and when the target vehicle is a mismatch with the reference vehicle, and (ii) the target license plate does not match the reference license plate and when the target vehicle matches the reference vehicle.

In a further implementation form of the first, second, and third aspects, further comprising a non-transitory medium storing program instructions, which, when executed by a processor, cause the processor to: feed the at least one SWIR image of the scene into at least one of a virtual reality and augmented reality process that computes at least one of a virtual reality scene and an augmented reality scene based on the at least one SWIR image.

In a further implementation form of the first, second, and third aspects, at least one of: the virtual reality scene is computed based on relative head motion and/or distance computed based on an analysis of objects depicted in the at least one SWIR image, and the augmented reality process generates an overlay for presentation over the at least one SWIR image.

In a further implementation form of the first, second, and third aspects, further comprising a non-transitory medium storing program instructions, which, when executed by a processor, cause the processor to: feed the at least one SWIR image of the scene into a navigation controller that controls autonomous navigation of a vehicle according to an analysis of objects depicted in the at least one SWIR image.

In a further implementation form of the first, second, and third aspects, analysis of the objects depicted in the at least one SWIR is performed independently of the time of day, and excludes analysis based on other external light sources.

In a further implementation form of the first, second, and third aspects, the at least one SWIR sensor is positioned in proximity to a reflective surface in the scene that creates glare by reflecting electromagnetic radiation comprising solar radiation from a sun, wherein the at least one SWIR sensor captures an image that excludes the glare.

In a further implementation form of the first, second, and third aspects, the at least one filter passes solar radiation at wavelengths which are mostly absorbed by water vapor in air depicted in the scene.

In a further implementation form of the first, second, and third aspects, the at least one filter passes electromagnetic radiation at wavelengths which are at least about 95% absorbed by water vapor in air.

In a further implementation form of the first, second, and third aspects, the SWIR wavelength range includes at least a wavelength band passed by the at least one filter.

In a further implementation form of the first, second, and third aspects, an image of a scene that is non-illuminated by the at least one SWIR illumination element and illuminated by solar radiation from a sun, appears mostly dark when captured by an imaging sensor of electromagnetic radiation passed by the at least one filter.

In a further implementation form of the first, second, and third aspects, the at least one filter is positioned at least one of: in a field of view of the at least one SWIR sensor, and in a field of illumination of the at least one SWIR illumination element.

In a further implementation form of the first, second, and third aspects, further comprising a non-transitory medium storing program instructions, which, when executed by a processor, cause the processor to: analyze the at least one SWIR image for biometric detection of at least one feature depicted within the respective SWIR image, the biometric detection selected from the group consisting of: a face, a person, a pose, a gesture, and a measurement of a body of a person.

In a further implementation form of the first, second, and third aspects, the processor executing the code instructions fails to recognize the at least one feature depicting within at least one visible light image captured by a visible light sensor substituted for the at least one SWIR sensor.

In a further implementation form of the first, second, and third aspects, the at least one feature depicted within the respective SWIR image is located behind a reflective surface that reflects solar radiation that creates a glare when captured by a visible light sensor substituted for the at least one SWIR sensor.

In a further implementation form of the first, second, and third aspects, the reflective surface comprises a window of a car, and wherein the processor executing the code instructions further analyzes the at least one SWIR image for detecting a boundary of a frame of the window of the car, and recognizing the at least one feature within the boundary of the frame.

In a further implementation form of the first, second, and third aspects, the at least one feature is detected by at least one of: (i) feeding the at least one SWIR image into a machine learning model trained on a training dataset of records, each record including a respective SWIR image generated by applying a transformation operation for converting a visible light image depicting a respective feature to a SWIR image depicting the respective feature, labelled with a ground truth label indicating the respective feature, and (ii) applying a transformation operation to the respective SWIR image for converting the respective SWIR image to a visible light image, and feeding the converted visible light image into a machine learning model trained on a training dataset of records, each record including a visible light image depicting a respective feature, labelled with a ground truth label indicating the respective feature.

In a further implementation form of the first, second, and third aspects, the at least one SWIR sensor captures the at least one SWIR image at a quality level above a threshold and a visible light sensor substituted for the at least one SWIR sensor captures at least one visible light image using visible light at a quality level below the threshold.

In a further implementation form of the first, second, and third aspects, the quality level denotes at least one member of the group consisting of: a signal to noise ratio, illumination level of pixels, absence of glare, and an accuracy of automatically identifying a feature depicted in the at least one SWIR image, the feature selected from the group consisting of: a face, a person, a pose, a gesture, a measurement of a body of a person, and an object used for vehicle navigation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE SPECIFIC EMBODIMENTS OF THE INVENTION

Figure 1:
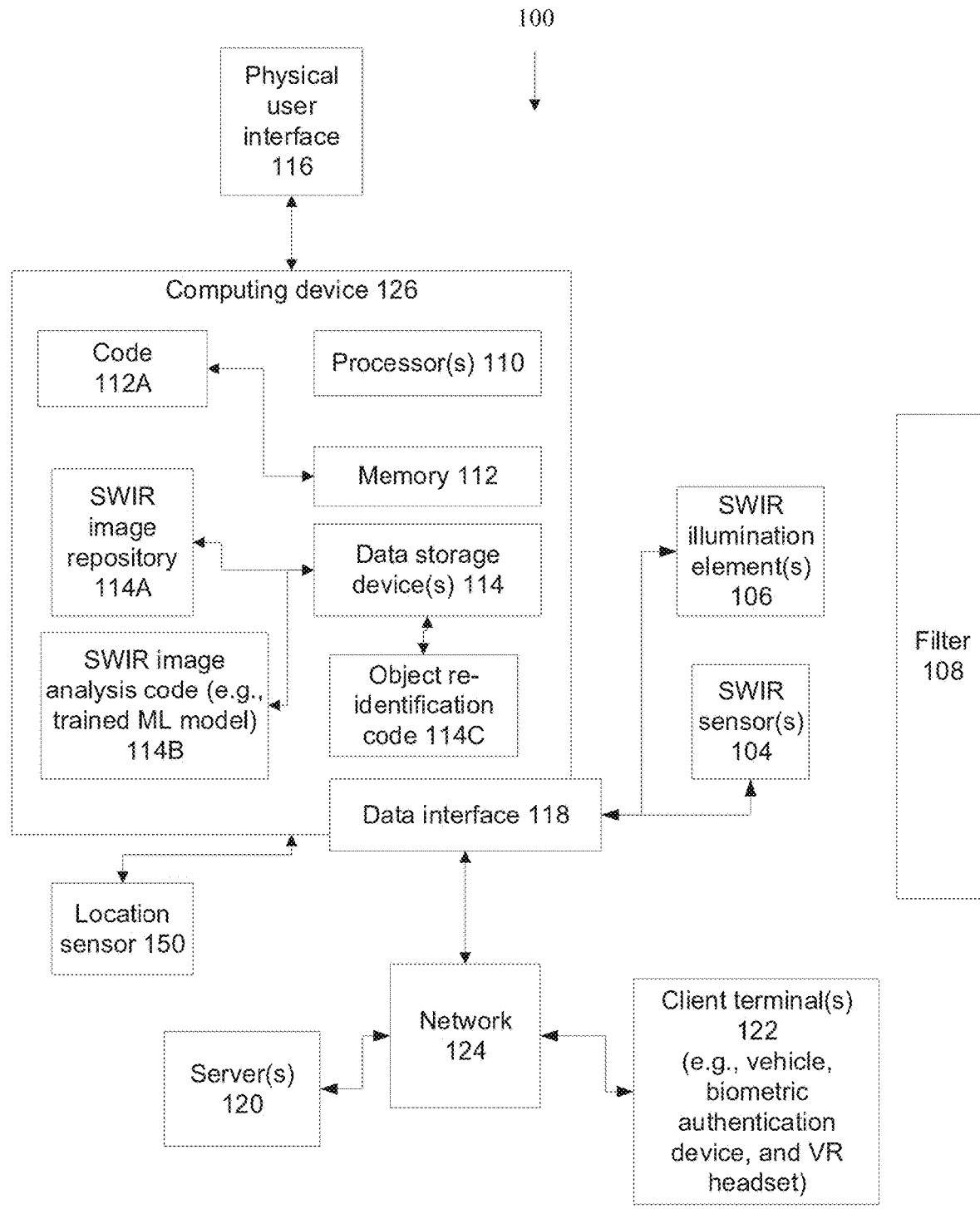
FIG. 1 is a schematic of a block diagram of components of a system for solar blind imaging of a scene, in accordance with some embodiments of the present invention.

The present invention, in some embodiments thereof, relates to imaging sensors and, more specifically, but not exclusively, to systems and methods for capturing images in environments with variable lighting.

As used herein, the term "solar blind range" refers to the wavelength spectrum at which electromagnetic radiation (e.g., generated by sunlight and/or artificial light sources) is highly (e.g., mostly) absorbed in the atmosphere (e.g., by water vapor in air) and/or has low emission for example, the range of about 1350-1450 nm, optionally 1360-1380 nm.

An aspect of some embodiments of the present invention relates to systems, methods, devices, and/or code instructions (stored on a data storage device and executable by one or more hardware processors) for imaging of a scene at the solar blind range. One or more short wave infrared (SWIR) illumination element generate illumination at a SWIR wavelength. One or more filters filter out electromagnetic radiation at wavelengths which are mostly non-absorbed by water vapor in air depicted in the scene. The filter passes electromagnetic radiation at wavelengths which are most absorbed by water vapor in air depicted in the scene. The filter may be a spectral narrow pass-band filter that passes wavelengths of about 1350-1450 nanometers (nm) and excludes wavelengths over about 1450 nm and below about 1350 nm, optionally the filter passes wavelengths of about 1360 nm-1380 nm and excludes wavelengths of over about 1380 nm and under about 1360 nm. The filter generates "solar blind images" at the "solar blind range". The wavelengths in the solar blind range are designed to be emitted by the SWIR illumination element, filtered by the filter, and captured by the SWIR sensor for generating the SWIR image, as described herein. A standard visible light camera (e.g., RGB, CMOS, CCD) located behind the filter generates image of the scene that appear dark. Sunlight is naturally blocked in the wavelength range that is passed by the filter. Artificial light sources do not emit significant amounts of electromagnetic radiation at the wavelength range that is passed by the filter. Such dark images of the scene cannot be used to significantly discern features of objects depicted therein. One or more SWIR sensors capture the SWIR illumination of the SWIR wavelength range, where the SWIR illumination passes through the filter prior to hitting the SWIR sensor. The SWIR images depict the scene independently of the amount of sun and/or artificial light, generating images that are free of glare from the sun, images captured at night in which features of objects may be significantly determined, and/or images that appear similar regardless of the time of day and/or environment (e.g., clouds, sunny, rain, snow, and the like).

It is noted that in some embodiments, the filter may be omitted and/or built in to the SWIR sensors and/or the SWIR illumination element. For example, the SWIR sensor(s) is designed to capture electromagnetic energy having wavelengths in the solar blind range without necessarily requiring a filter, and/or using a built-in filter. In another example, the SWIR illumination element is designed to generate electromagnetic energy having wavelengths in the solar blind range without necessarily requiring a filter, and/or using a built-in filter.

An aspect of some embodiments of the present invention relates to systems, methods, devices, and/or code instructions (stored on a data storage device and executable by one or more hardware processors) for analyzing images of a target object at the solar blind range. One or more SWIRs illumination elements generate SWIR illumination at the solar blind range for illumination of the target object. One or more SWIR sensors capture SWIR images of the target object under SWIR illumination at the solar blind range. A processor executes instructions (e.g., stored on a non-transitory medium) for analyzing the SWIR image(s), for comparing the target object to a reference object. The processor outputs an indication of whether the target object matches the reference object, for example, whether the target object is the same as the reference object (e.g., biometric, whether the same person is depicted as the target object and the reference object), and/or whether the target object which is physically different than the reference object appears similar to the reference object (e.g., whether physically unique manufactured parts are similar to a reference manufactured part). One or more actions may be triggered in response to the indication.

At least some embodiments described herein address the technical problem of capturing images without glare from the sun, and/or reduced glare from the sun. Glare may significantly impact the quality of the image. For example, glare on a face of an individual depicted in the image cannot be analyzed by an automated process (e.g., machine learning model) to determine the identity of the person. At least some embodiments described herein address the technical problem of capturing images without impact of lighting conditions (e.g., sun and/or artificial lighting) and/or without impact of the time of day (e.g., night, early morning, noon, early evening) and/or environment (e.g., overcast, sunny, rain, snow), such that images of the same scene captured under different lighting conditions and/or different times of the day and/or different environmental conditions appear similar. For example, images captured under different lighting conditions and/or time of day and/or environment may cause errors when analyzed by an automated process (e.g., machine learning model), for example, the machine learning model may incorrectly identify a dark area created due to a cloud blocking the sun as a significant feature when it is not. In another example, images captured for navigation of a vehicle (e.g., indoor and/or outdoor) are impacted by the light/environment. Objects located outdoors (e.g., other cars, trees, signs, buildings) and/or objects located indoors (e.g., walls, ceiling, floor, furniture) may appears different during different times of the day and/or under different lighting environments, impacting the ability of a navigation controller to navigate the vehicle based on the captured imaged. In another example, the sunlight may interfere with 3D and/or scene imaging used by virtual reality (VR) headsets to measure relative head motion and/or distance. Standard approaches for dealing with the problem of glare and/or variable light conditions include: waiting for the sun and/or weather and/or time of day to be at the desired state, adding complex image analysis processes to handle artifacts due to the variable lighting conditions, using another verification process when glare and/or lighting does not enable verification using images, and training the machine learning model on a very large training dataset that includes many images of the same scene captured at many different lighting conditions and/or weather conditions and/or time of day.

At least some embodiments described herein address the above mentioned technical problem, and/or improve the technical field of image capture, by using a SWIR sensor to capture SWIR images at the SWIR wavelength illuminated by the SWIR illumination element that generates illumination at the SWIR wavelength, where the SWIR illumination passes through the filter that filters out wavelengths which are mostly non-absorbed by water vapor in air and/or passes wavelengths which are mostly absorbed by water vapor in the air. Such SWIR images of the scene, when lit by the SWIR illuminator, are not impacted by one or more of: glare from the sun, artificial lighting, time of day, and environmental conditions. The SWIR images may be used for different applications, for example: verification of identity of an individual even when sun glare in the visible light range does not enable accuracy detection, improved accuracy of VR headsets by eliminating errors due to interference from sunlight in measuring relative head motion and/or distance, and improved accuracy of a navigation controller of a vehicle in navigation using the SWIR images instead of visible light images, by reducing errors of the analysis of the images (i.e., since the SWIR images do not have artifacts created by variable lighting which otherwise appear in visible light images, and/or reduction in amount of images needed to train a machine learning model since the SWIR images captured under different lighting conditions appear the same, additional images captured under different lighting conditions are not needed.

At least some embodiments described herein address the technical problem of object re-identification in an image, in particular, the technical problem of improving the task of object re-identification in an image captured in an environment of sun and/or artificial light that causes glare, that makes it technically challenging to perform object re-identification based on standard approaches. At least some embodiments described herein address the technical field of image analysis, in particular, analyzing an image to determine whether an object depicted in the image matches a reference object, also referred to herein as object re-identification.

The task of object re-identification relates to determining that an object appearing in a certain image (e.g., photo or video sequence) is the same as that previously identified and/or tagged in other such photos/sequences, also referred to herein as a reference object. It is noted that the task of object re-identification is different from other image processing tasks, for example, object detection (e.g., "there is a car in the image"), object classification/recognition (e.g., "the car in the image is a Ford Focus station") and object segmentation (e.g., "these pixels in the image are part of the car, the others are not"). An example of object re-identification is biometrics, where the object may be for example, fingers, iris, face etc. Another example is person re-identification based on clothing/accessories. Yet another example is image based localization as used in autonomous navigation, where the current images are compared to past images of the same environment to determine the location of the vehicle (e.g., car, robot, UAV) based on the re-identification of key-points or objects. Yet another example is the technical field of traditional industrial machine vision inspection systems for quality verification, where often there is a reference look for the object, and all produced copies are verified to be extremely similar to the reference with the potential change of position and orientation (e.g. packages, metal parts, PCB's, Silicon wafers during production etc.).

Standard approaches for capturing images and performing object re-identification, in particular for industrial application such as quality verification of manufacturing, which are performed in highly controlled environments, where lighting is well controlled (e.g., external sun and/or other light sources are blocked) and/or where the camera position and/or orientation is carefully selected. Standard approaches in the non-industrial world in regular spaces (e.g., outdoors impacted by sun, in buildings impacted by different artificial light sources, etc.) for example for biometrics, take special precautions to adjust for inevitable appearance changes due to the plastic nature of the object, biological factors and/or uncontrolled external illumination. Even for rigid bodies, for example, cars, metal/concrete constructions, and paved roads, the large potential changes in illumination make a direct comparison to reference images technically impractical. Hence, for localization/navigation or object re-identification special methods have been developed to handle external changing and uncontrolled illumination sources. These methods typically require extensive processing resources and/or memory resources, and/or produce less reliable results, for example, since it is difficult for a trained neural network to tell whether a current object in a current image is the same as a reference object in a reference image when the current image and the reference image are captured under different external illumination sources that make the current object and reference object appear to be different and/or where background objects may appear to be part of the current and/or reference object when in fact they are not.

At least some embodiments described herein address the above mentioned technical problem, and/or improve the above mentioned technical field, and/or improve over prior approaches, related to object re-identification, by using a SWIR illumination element that emits at the solar blind range and/or SWIR sensor that senses at the solar blind range, optionally using a filter that passes electromagnetic energy at the solar blind range. The SWIR images depicting target objects and/or reference objects are analyzed to determine object re-identification by comparing the target object to the reference object, rather than and/or in addition to standard approaches such as visible light. Using SWIR images at the solar blind range provides one or more of the following potential advantages (some of which apply to other problems and/or other improvements described herein):

Higher accuracy of matching the target object to the reference object, by reducing or eliminating glare and/or undesired lighting external to the solar blind range. For example, a bright object placed near a reflecting and/or bright background surface may appear as one large object that includes the bright object and the background surface under regular sunlight. Using SWIR, the bright object is more accurately distinguished (e.g., segmented) from the background surface which appears dark under SWIR illumination.

Ability to use strong SWIR illumination at the solar blind range, which may be much stronger than other standard artificial light sources in the visible range. Since SWIR illumination cannot be seen by the human eye and/or is safe for the human eye, strong SWIR illumination may be generated to SWIR images with well illuminated target objects, enabling higher accuracy for matching to reference objects. Using standard approaches of shining visible light (or other wavelengths) to more strongly illuminate objects are limited in terms of safety to the human eye and/or discomfort to the human eye.

Objects in SWIR images at the solar blind range are more accurately and/or more easily detected, optionally segmented, automatically by image processing code. The more accurate and/or more easy detection arises since additional processing to account for glare and/or other strong artificial lighting that generates artifacts and/or distorts images is not present (or not significantly present) in SWIR images. In comparison, in other images generated using other wavelengths such as visible light, additional processing is required to account for the glare and/or other artifacts arising from visible light. Fewer processing resources and/or fewer memory resource and/or a shorter processing time may be used to process SWIR images for object re-identification in comparison to processing other images such as visible light images. For example, a training dataset for training a neural network to perform object re-identification may require a large amount of images depicting different visible lighting conditions for the same object using visible light images, in comparison to a single or fewer SWIR images that depict the same object since at the solar blind range the same object appears the same under the different visible lighting conditions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic of a block diagram of components of a system 100 for solar blind imaging of a scene, in accordance with some embodiments of the present invention. The scene may be, for example, an entrance to a shopping mall, entrance to a parking lot, entrance to a secure building, a city street, a yard of a house, and/or other environments being monitored and/or surveyed, for example, for obtaining biometric clearance, for computing parameters for a 3D V R headset, and for navigation of a vehicle.

System 100 includes one or more SWIR sensor(s) 104 that capture SWIR image(s) of the scene at a SWIR wavelength range that includes the solar blind range. Examples of SWIR sensor(s) 104 include: Plasmon based CMOR, balometer array based FIR, and 3D passive imaging.

For clarity and simplicity of explanation, as used herein, the term SWIR sensor refers to one or more SWIR sensors, and the term SWIR illumination element refers to one or more SWIR illumination elements.

System 100 may include one or more SWIR illumination element(s) 106 that generates SWIR illumination at the SWIR wavelength range detectable by the SWIR sensor 104.

SWIR illumination element 106 generates at least some SWIR illumination at the solar blind range, i.e., having wavelengths in the range of about 1350-1450 nanometers (nm). Optionally, SWIR illumination element 106 generates SWIR illumination having wavelengths in the range of about 1360 nm-1380 nm.

SWIR illumination element 106 may include artificial controlled illumination sources with emission in the solar blind range SWIR illumination element 106 may be, for example, pulsed, continuous, polarized, diffuse and/or stroboscopic. The intensity of SWIR illumination element 106 may be much higher than for example visible light sources, as the SWIR illumination generated by the SWIR illumination element 106 is not detected by the human eye and/or by other visible wavelength sensors. SWIR illumination at the solar blind range (e.g., 1360-1380 nm band and/or other bands with high absorption by water and/or water vapor), may be much stronger than sources in other wavelengths such as the visible light range, while still protecting the eye within safety limits.

System 100 includes one or more filters 108 that filters out electromagnetic radiation at wavelengths which are mostly non-absorbed by water vapor in air depicted in the scene and/or which passes electromagnetic radiation at wavelengths which are mostly absorbed by water vapor in air depicted in the scene. For example, filter 108 passes electromagnetic radiation at wavelengths which are at least about 95% (or at least about 90%, or other values) absorbed by water vapor in air.

Filter 108 is designed to exclude wavelengths that may cause glare and/or other artifacts when reflected off the scene, for example, in the visible light range.

Filter 108 may include a spectral narrow pass-band filter that passes wavelengths of about 1350-1450 nanometers (nm) and/or excludes wavelengths over about 1450 nm and/or below about 1350 nm. Optionally, filter 108 passes wavelengths of about 1360 nm-1380 nm and/or excludes wavelengths of over about 1380 nm and/or below about 1360 nm.

It is noted that in some embodiments, filter 108 may be omitted and/or built in to the SWIR sensors 104 and/or the SWIR illumination element 106. For example, the SWIR sensor(s) 104 is designed to capture electromagnetic energy having wavelengths in the solar blind range without necessarily requiring a filter, and/or using a built-in filter. In another example, the SWIR illumination element 106 is designed to generate electromagnetic energy having wavelengths in the solar blind range without necessarily requiring a filter, and/or using a built-in filter.

The SWIR wavelength range emitted by SWIR illumination element 106 includes at least a wavelength band passed by filter 108 and sensed by SWIR sensor 104.

SWIR illumination generated by SWIR illumination element 106 passes through filter 108 at some point before reaching SWIR sensor 104, on the path away from SWIR illumination element 106 towards objects of the scene (i.e., before being reflected off the objects at the scene), and/or on the path towards SWIR sensor 104 (i.e., after being reflected off the objects at the scene).

SWIR sensor 104 captures the SWIR illumination of the SWIR wavelength range generated by SWIR illumination element 106, which is passed by filter 108. SWIR sensor 104 generates one or more SWIR image of the scene, for example, as still images, and/or as a video (e.g., frames of the video).

It is noted that a standard visible light sensor (e.g., CCD, CMOS) such as a camera, substituted for the SWIR sensor 104, would generate dark images, even on a bright sunny day and/or of a scene well lit by artificial light. Such dark images cannot be analyzed for determining features of objects depicted therein, and/or cannot be used for applications as described herein. Moreover, an SWIR image of the scene captured by SWIR sensor 104, where the scene is non-illuminated by SWIR illumination element 106 and illuminated by another visible light such, such as solar radiation from a sun and/or an artificial visible light (which may have passed through filter 108, or even when not passing through filter 108) appears mostly dark. The SWIR illumination element 106 provides sufficient SWIR illumination such that even after absorption by water vapor in the air, and after passing through filter 108, sufficient amount of SWIR illumination reaches SWIR sensor 104 to generate the SWIR image of sufficient quality, for example, that may be analyzed for applications such as identity verification, vehicle navigation, and VR headset settings.

SWIR sensor 104 captures the SWIR image at a quality level above a threshold, for example, in comparison to a visible light sensor that when substituted for the SWIR sensor 104 captures a visible light image using visible light at a quality level below the threshold. The quality of the SWIR may be sufficient while the quality of the visible light image may be insufficient, for example, to be analyzed for application such as biometric validation, navigation of a vehicle, and determining settings of a VR headset, such as due to presence of glare and/or poor environmental conditions. Examples of the threshold for differentiating between high quality and low quality images include: a signal to noise ratio, illumination level of pixels, absence of glare, and an accuracy of automatically identifying a feature depicted in the at least one SWIR image, the feature selected from the group consisting of: a face, a person, a pose, a gesture, a measurement of a body of a person, and an object depicted in the scene for automatic navigation of a vehicle (e.g., other cars, buildings, street signs, trees, furniture, wall, and ceiling).

When the SWIR sensor 104 is positioned in proximity to a reflective surface in the scene that creates glare by reflecting electromagnetic radiation that includes solar radiation from a sun and/or includes artificial visible light from an artificial visible light source, the SWIR image captured by SWIR sensor 104 excludes the glare.

Filter 108 may be positioned within a field of view (e.g., an entire field of view) of the SWIR sensor 104, for example, located in front of the SWIR sensor 104. SWIR illumination (e.g., generated by SWIR illumination element 106) reflecting off objects of the scene within the field of view passes through the filter 108 to reach the SWIR sensor 104. Optionally, all of the SWIR wavelengths that are sensed by the SWIR sensor 104 first pass through filter 108 before arriving at SWIR sensor 104.

SWIR illumination element 106 may be positioned behind filter 108, i.e., filter 108 is positioned within the field of illumination of SWIR illumination element 106, such that the SWIR illumination generated by SWIR illumination element 106 passes through filter 108 towards the scene before being reflected by objects in the scene. Alternatively, SWIR illumination element 106 may be positioned externally to filter 108 such that the generated SWIR illumination does not pass through filter 108 when transmitted towards the scene, but then passes through filter 108 before reaching SWIR sensor 104.

Optionally, system 100 includes one or more of the following components:

Hardware processor(s) 110, which may interface with SWIR sensor(s) 104 for receiving SWIR image(s). Processor(s) 110 may interface with other components, described herein.

Processor(s) 110 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 110 may include a single processor, or multiple processors (homogenous or heterogeneous) arranged for parallel processing, as clusters and/or as one or more multi core processing devices.

Memory 112, which stores code 112A for execution by processor(s) 110. Code 112A may include program instructions for implementing one or more features of the method described with reference to FIG. 2, for example, analyzing the SWIR, such as for biometric identification, VR headset configuration, and/or vehicle control. Memory 112 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Code 112A may include instructions for detecting features in SWIR images and/or for generating other outcomes, which may be used by other processes, such as biometric analysis, vehicle navigation, and configuration of the VR headset. Code 112A may include, for example, a trained machine learning (ML) model, trained using a supervised and/or non-supervised approach. Examples of ML models include one or more neural networks of various architectures (e.g., artificial, deep, convolutional, fully connected), support vector machine (SVM), logistic regression, k-nearest neighbor, decision trees, and combinations of the aforementioned. The ML model may be trained using a training dataset of SWIR images captured as described herein, which may be labelled with ground truth labels.

Data storage device(s) 114, which may store data, for example, SWIR image repository 114A that stores the captured SWIR images, and/or SWIR analysis code 114B that analyses the captured SWIR images and/or object re-identification code 114C that determines whether an object in a current SWIR image matches a reference object, for example, a machine learning model that performs biometric analysis and/or a machine learning model that analyses the SWIR image for navigation of a vehicle. Data storage device(s) 114 may be implemented as, for example, a memory, a local hard-drive, virtual storage, a removable storage unit, an optical disk, a storage device, and/or as a remote server and/or computing cloud (e.g., accessed using a network connection).

Location sensor 150, for example, a global positioning sensor, code that computes location by triangulation, by identifying a reference marker, and the like. The location may be associated with the SWIR image, for example, to perform image based localization, as described herein.

Physical user interface 116 that includes a mechanism for user interaction, for example, to enter data (e.g., select processing of SWIR images, such as for biometric analysis) and/or to view data (e.g., the captured SWIR images and/or the out of the analysis of the SWIR images such as whether the person depicted in the SWIR is validated). Exemplary physical user interfaces 116 include, for example, one or more of, a touchscreen, a display, gesture activation devices, a keyboard, a mouse, and voice activated software using speakers and microphone. It is noted that the user interface (e.g., touch screen) of client terminal(s) 122 may be used as user interface 116.

Data interface 118. Data interface 118 provides communication with external devices (e.g., server(s) 120 and/or client terminal(s) 122) optionally over a network 124, for example, for providing captured SWIR images and/or for providing results of analysis of SWIR images by code 112A and/or for receiving instructions for control of SWIR sensor(s) 104 and/or processor(s) 110 and/or other components. For example, the SWIR images and/or video captured by SWIR sensor(s) 104 may be streamed (e.g., in real time) over network 124 to server(s) 120 and/or client terminal(s) 122 for remote viewing and/or remote processing.

Data interface 118 may be implemented as, for example, one or more of, a network interface, a USB port, a network interface card, an antenna, a wireless interface to connect to a wireless network, a short range wireless connection, a physical interface for connecting to a cable for network connectivity, a virtual interface implemented in software, network communication software providing higher layers of network connectivity, and/or other implementations.

Network 124 may be implemented as, for example, the internet, a broadcast network, a local area network, a virtual network, a wireless network, a cellular network, a local bus, a point to point link (e.g., wired), and/or combinations of the aforementioned. It is noted at a cable connecting processor(s) 110 and another device may be referred to herein as network 124.

It is noted that one or more of processors 110, memory 112, data storage device 114, data interface 118, user interface 116, SWIR sensor(s) 104, SWIR illumination element(s) 106, and filter 108 may be part of a computing device 126 and/or may be integrated within a housing, for example, within a vehicle, VR headset, and biometric kiosk.

Computing device 126, server(s) 120 and/or client terminal(s) 122 may be implemented as, for example one or more and/or combination of: a group of connected devices, a client terminal, a server, a computing cloud, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

Server(s) 120 may be implemented as, for example, a security server that may analyze the received SWIR images(s) (using code 112A stored on a memory associated with the respective server) and/or grant access to the user upon biometric identification.

Client terminal 122(s) may be implemented as, for example, a vehicle with a navigation controller that computes instructions for navigation of the vehicle based on SWIR images, a VR headset that computes head orientation based on the SWIR sensor, and/or a biometric controller that generates instructions for automatically opening a door for a person when the identity of the person is detected using the SWIR image.

Communication between processor(s) 110 and/or server(s) 120 and/or client terminal(s) 122 over network 124 may be implemented, for example, via an application programming interface (API), software development kit (SDK), functions and/or libraries and/or add-ons added to existing applications executing on server(s) 120 and/or client terminal(s) 122, and/or an application for download and execution on server(s) 120 and/or client terminal(s) 122 that communicates with processor(s) 110, function and/or interface calls to code executed by processor(s) 110.

It is noted that code 112A may be stored on memory 112 located within computing device 126, for example, for local analysis and/or processing of SWIR images captured by SWIR sensor(s) 104. Alternatively or additionally, one or more portions of code 112A may be stored externally to computing device 126, for example, on a memory located in association with server(s) 120 and/or client terminal(s) 122, for example, SWIR images captured by SWIR sensor(s) 104 are provided over network 124 for remote analysis and/or processing by server(s) 120 and/or client terminal(s) 122.

Figure 2:
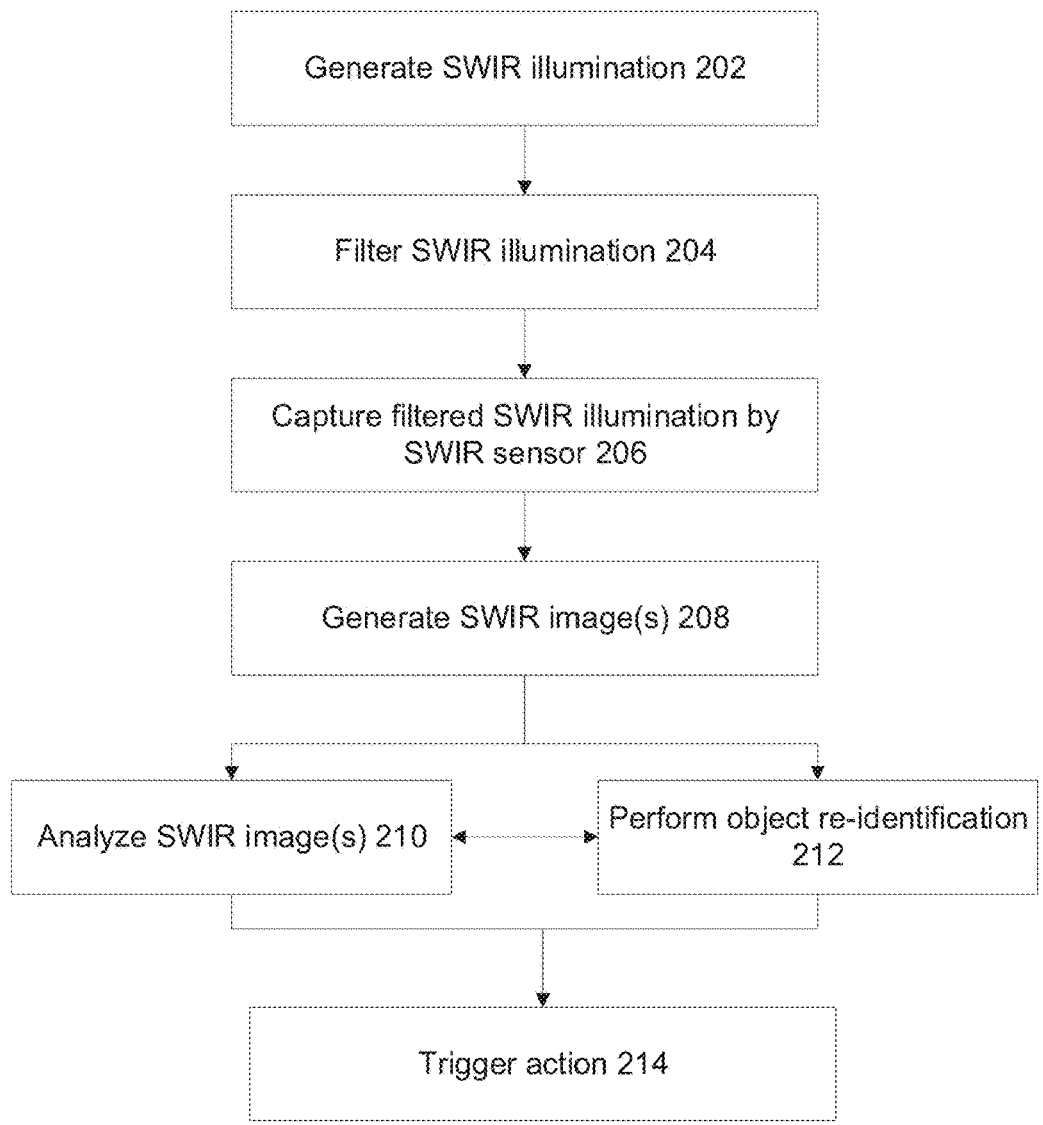
FIG. 2 is a flowchart of a method for performing an action in response to imaging of a scene using SWIR images, in accordance with some embodiments of the present invention.

Reference is now made to FIG. 2, which is a flowchart of a method for performing an action in response to imaging of a scene using SWIR images, in accordance with some embodiments of the present invention. Components of system 100 described with reference to FIG. 1 may implement the method described with reference to FIG. 2, for example, SWIR sensor(s) 104 generates SWIR images in response to SWIR illumination generated by SWIR illumination element 106 passing through filter 108, and/or processor(s) 110 executing code instructions (e.g., code 112A) stored in memory 112 for processing and/or analyzing the SWIR images, for example, for detecting features depicted therein.

At 202, SWIR illumination is generated at the SWIR wavelength range by the SWIR illumination element.

At 204, the SWIR illumination may be passed through a filter that filters out electromagnetic radiation at wavelengths which are mostly non-absorbed by water vapor in air depicted in the scene and/or passes electromagnetic radiation at wavelengths which are mostly absorbed by water vapor in air depicted in the scene, i.e., the solar blind range.

Optionally, the filter may be omitted when the SWIR illumination element generates SWIR illumination at the solar blind range and/or the SWIR sensor captures SWIR illumination at the solar blind range.

At 206, the SWIR illumination of the SWIR wavelength range which is passed by the filter is captured by the SWIR sensor.

At 208, the SWIR sensor generates one or more SWIR images of the scene from the filtered and captured SWIR illumination.

The SWIR images may be provided as individual images and/or as a stream (e.g., video). The SWIR images may be, for example, stored on a memory, presented on a display, forwarded to a remote device, and/or provided to a local process for further processing.

At 210, the SWIR image(s) is analyzed, for example, by being fed into a ML model trained to generate an outcome, for example, identify one or more features and/or generate the result (e.g., validation of face). Some exemplary analysis approaches for exemplary applications are now described. It is to be understood that there may be other analysis approaches for other applications.

Optionally, the SWIR image is fed into a machine learning model trained on a training dataset of records. Each record may include a respective SWIR image captured by the SWIR sensor, labelled with a ground truth label indicating the respective feature.

Alternatively or additionally, the SWIR images of the training dataset are not captured by the SWIR sensor, but generated by applying a transformation operation for converting visible light images (captured by a visible light sensor) depicting respective features to SWIR images depicting the respective features. Such approach may be used when training images are not available as SWIR images but only in visible light format.

Alternatively or additionally, a transformation operation is applied to the SWIR image being analyzed, for converting the SWIR image being analyzed to a visible light image. The converted visible light image is then fed into a machine learning model trained on a training dataset of records, each record including a visible light image depicting a respective feature, labelled with a ground truth label indicating the respective feature. Such approach may be used when training images are not available as SWIR images but only in visible light format.

It is noted that visible light images captured by a visible light sensor substituted for the SWIR sensor and filter may not be useful for analysis, for example, generating inaccurate results and/or without the ability to generate results at all. For example, a visible light image with glare against the face of a person, when fed into the trained ML model, fails to recognize the face of the person due to glare. Since the SWIR image excludes sunlight, there is no glare, and the ML model is able to accurately identify the face.

Biometric—the SWIR image may be analyzed for biometric detection of one or more features depicted within the respective SWIR image. Examples of features used for biometric detection include: a face, a person, a pose, a gesture, and a measurement of a body of a person.

The feature used for biometric detection (or another feature used for another application) may be located behind a reflective surface that reflects solar radiation that creates a glare when captured by a visible light sensor substituted for the SWIR sensor. For example, the reflective surface is a window of a car. The SWIR image is analyzed for detecting a boundary of a frame of the window of the car, and recognizing feature (e.g., used for biometric detection) within the boundary of the frame.

Virtual reality/Augmented reality—the SWIR image may be analyzed to compute relative head motion and/or distance based on objects depicted in the SWIR image. The SWIR image, which excludes interference artifacts created by sunlight, provides a more accurate measurement of head motion and/or distance, for example, in comparison with visible light images that depict sunlight for which the sunlight may affect the measurement of the head motion and/or distance.

Vehicle navigation—the SWIR image may be analyzed to identify objects which impact navigation of the vehicle. For example, identification of other cars, street signs, buildings, obstacles on the road, trees, and the like. Analysis of objects depicted in the SWIR is performed independently of the time of day, independently of the amount of sunlight, and the analysis excludes analysis based on other external light sources. The scene of the street for outdoor navigation, and/or the indoor scene (e.g., the walls, ceiling, floor, furniture) look the same regardless of the time of day and/or sunlight. Examples of vehicles that may be navigated using the SWIR images include: cars, drones, and robots. Navigation may be fully automatic, and/or based on advanced driver assistance systems (ADAS) which may be activated based on the analysis.

At 212, an object re-identification process may be performed. An indication of whether the target object matches the reference object may be generated.

The object re-identification process may be performed following the analysis described with reference to 210, for example, the analysis is performed to detect whether a current SWIR image depicts a target object. When the target object is detected, the object re-identification process is triggered. Alternatively, object re-identification process may be performed as an alternative to the analysis described with reference to 210, for example, on a manufacturing line where it is assumed that the SWIR image depicts the object.

Optionally, prior to the object re-identification process, and/or as part of the object re-identification process, a position and/or orientation of the target object depicted in the SWIR image is adapted to obtain an adapted target object. The adapted target object is compared to the reference object. For example, when it is know that the reference object is depicted at a certain viewing orientation, the target object which may be depicted in a different viewing orientation is adapted to the certain viewing orientation, to allow for a more accurate and/or computationally efficient match with the reference object.

The object re-identification process may be performed by comparing a target object depicted in the SWIR image to a reference object depicted in a reference representation, for example, a reference SWIR image, a reference set of features, and a reference visible light image (e.g., where the SWIR image is converted to the visible light image, as described herein).

The reference object may be the same object as the target object depicted in a reference SWIR image and/or video sequence captured prior to the current SWIR image, for example, a biometric check in which an image of a person is compared to a previous image of the same person to validate the person when the images match. The reference object may be a different physical object than the target object, for example, each manufactured object which is to be the same (within a manufacturing tolerance) is compared to a reference manufactured object.

Exemplary approaches for object re-identification include: template matching, normalized post correlation, machine learning based approaches (e.g., a discriminative network that evaluates whether two images are similar, a Siamese neural network that performs image embedding, and the like), and/or by matching features extracted from the target objects to features extracted from the reference object (e.g., by Harris Corner Detection, SIFT (Scale-Invariant Feature Transform), SURF (Speeded-Up Robust Feature), and the like.

Exemplary target objects and/or exemplary applications of object re-identification using SWIR images include:

Biometrics—The target object is a part of a human body, for example, face, eye, iris, ear, finger. The comparison performs a biometric verification that the target part of the human body matches a reference part of the human body of the same person.

Person re-identification based on clothing/accessories—the target object is clothing and/or accessories worn by a subject, and the comparison for a re-identification that the clothing and/or accessories match a reference clothing and/or accessories of the subject.

Image based localization—the SWIR sensor may be associated with a location obtained from a location sensor. The target object and target location may be compared to a reference object associated with a reference location, for example, images of the same object in the same environment obtained prior to the current image. The comparison may be done, for example, to identify the location of a vehicle, optionally an autonomous vehicle (e.g., car, robot, UAV, drone), semi-autonomous vehicle, and/or to provide an indication of location to a driver of the vehicle. The comparison may be done to identify key-points and/or objects to help locate and/or orient the vehicle.

Industrial inspection systems—traditional industrial machine visions inspection systems are designed to verify whether copies of target objects (e.g., manufactured, produced, assembled, injection molded, welded) such as packages, metal parts, PCBs, and silicon wafers, match a reference object (e.g., within manufacturing tolerances). Copies of the target object that match the reference object may be passed a quality inspection scan. Copies of the target object that do not match the reference object may fail the quality inspection scan. It is noted that the target object may be in a different position and/or orientation relative to the reference object, while still matching the reference object. In such a case, the image of the target object may be adapted by computing a transformation of the position and/or orientation to that of the reference object, for comparison of the transformed target object to the reference object, as described herein.

Security—The reference object may be a reference vehicle with a reference license plate detected from a reference SWIR image, for example, upon entry into a secure zone. For example, the SWIR image of the reference vehicle and reference license plate is obtained by a sensor positioned at a gate to a secure parking lot of a government building. A target vehicle with a target license plate is obtained from a target SWIR image, for example, a sensor that is set to capture images of vehicle leaving the secure parking lot. A security alert is generated when the target license plate matches the reference license plate, and when the target vehicle is a mismatch with the reference vehicle. The mismatch in vehicles but match in license plates indicates that the reference license plate was removed from the reference vehicle, and placed on another vehicle, in an attempt to leave without being noticed, indicating a security threat. Alternatively or additionally, the security alert is generated when the target license plate does not match the reference license plate and when the target vehicle matches the reference vehicle. Comparison of the vehicle shape and/or parts themselves may be compared. The mismatch in license plates but match in vehicles may indicate that a person stole and/or forged a 'valid' license plate, and is attempting to enter and/or exit a facility with those plates on a different vehicle model.

At 214, one or more actions are triggered in response to the analysis of the SWIR image and/or in response to the object re-identification. For example, instructions may be generated in response to the output of the ML model and/or in response to an identification of whether the target object has been matched to the reference object or not been matched to the reference object. It is to be understood that there may be other analysis approaches for other applications.

Biometric—in response to validating the identity of the person depicted in the image, entry may be granted to the person, for example, a door of a building is automatically unlocked, and/or a gate into a parking garage is lifted to allow the person to drive their car into the parking garage.

Virtual reality/Augmented reality—the SWIR image of the scene may be fed into a virtual reality and/or augmented reality process that computes a virtual reality scene and/or an augmented reality scene based on the relative head motion and/or distance computed from the analysis of the SWIR image. The augmented reality process may generates an overlay for presentation over the SWIR image, and/or may use the relative head motion and/or distance computed from the analysis of the SWIR image for generating an overlay for presentation within heads-up display glasses that present the overlay over the "real world" as seen through the glass, and/or for generating an overlay for presentation over a visible light image captured by a visible light sensor.

Inspection system—when the target object does not match the reference object, one or more regions of the SWIR image depicting mismatches between the target object and the reference object may be generated, for example, as an overlay, an arrow pointing to the mismatch, a border demarcating the mismatch, a segmentation depicting the mismatch, and pixel coordinates of the mismatch. The mismatch may be provided, for example, presented on a display, and/or fed into an automated process such as a robot to fix the mismatch and/or remove the target object that failed the inspection.

Vehicle navigation—the SWIR image and/or outcome of the analysis and/or object re-identification may be fed into a navigation controller that controls autonomous navigation of a vehicle, and/or into an ADAS system that activates one or more sub-systems (e.g., automatic braking).

Security—in response to the object re-identification indicating a security threat, action can be taken, for example, a message sent to security forces, automatic lockdown of a premises such as lock of gates, and/or doors.

The instructions may be for manual and/or automatic implementation. For example, the instructions may be for manual implementation, for example, presenting a pop-up window on a display of a biometric server stating "Known criminal identified, call police now". In another example, the instructions may be for automatic implementation, for example, code for execution by one or more processors. For example, the instructions are to automatically open a door when an identity of the face of the person depicted in the SWIR image(s) is matched with a list of employees.

Figure 3:
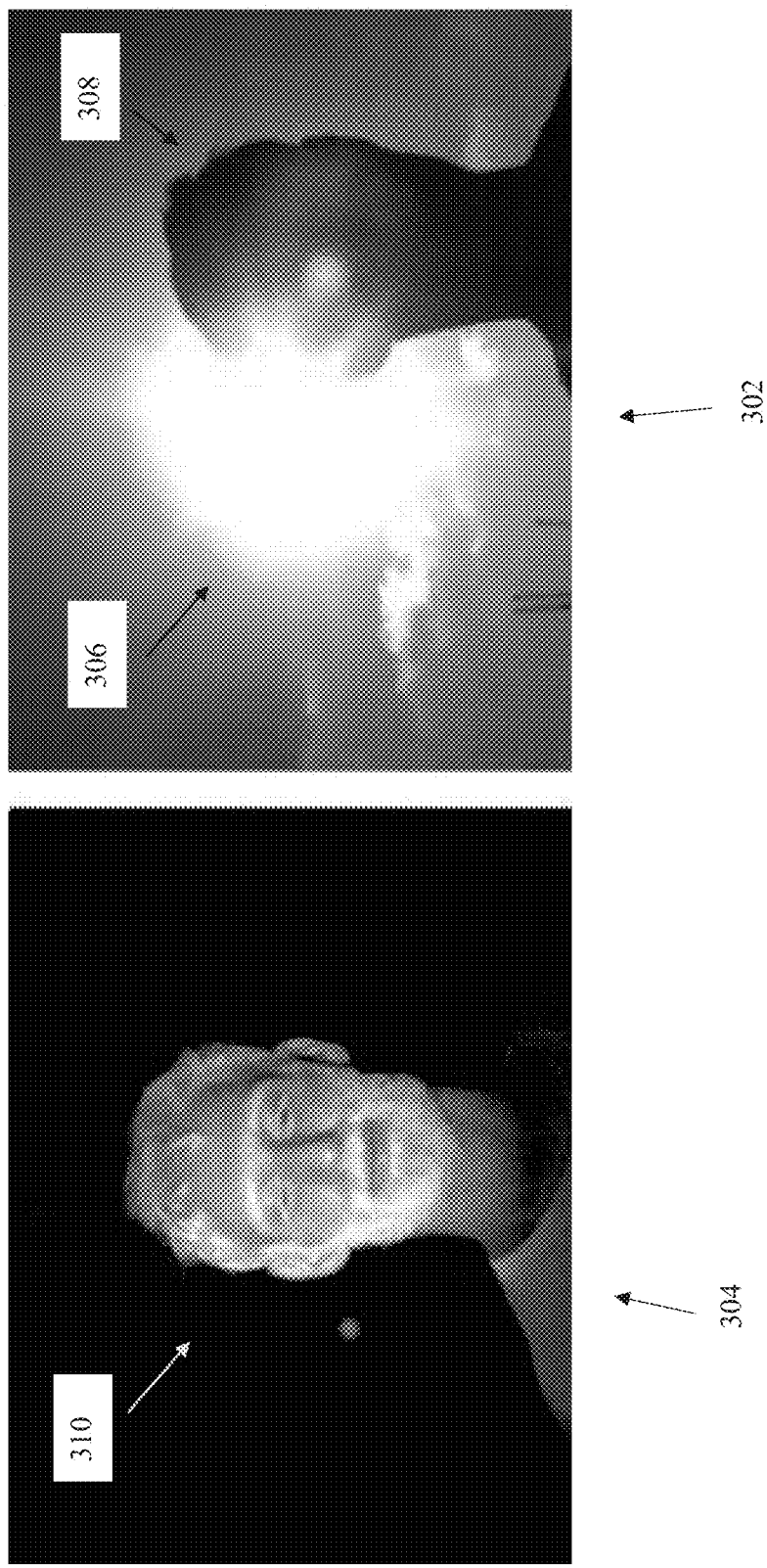
FIG. 3 is a schematic comparing a visible light image captured by a visible light sensor with a SWIR image generated by a SWIR sensor capturing filtered SWIR illumination generated by a SWIR illumination element, in accordance with some embodiments of the present invention.

Reference is now made to FIG. 3, which is a schematic comparing a visible light image 302 captured by a visible light sensor with a SWIR image 304 generated by a SWIR sensor capturing filtered SWIR illumination generated by a SWIR illumination element, in accordance with some embodiments of the present invention. As seen, image 302 suffers from glare 306 created by the sun. A face 308 of a person depicted in image 302 is of low image quality. Facial features cannot be identified in face 308. As such, image 302 cannot be used, for example, by a biometric process to automatically detect and recognize the face of the individual. In contrast, a face 310 of a person is of high image quality, being clearly visible in image 304. Facial features can accurately be identified in face 310. As such, image 304 can used, for example, by the biometric process to automatically detect and recognize the face of the individual.

Figure 4:
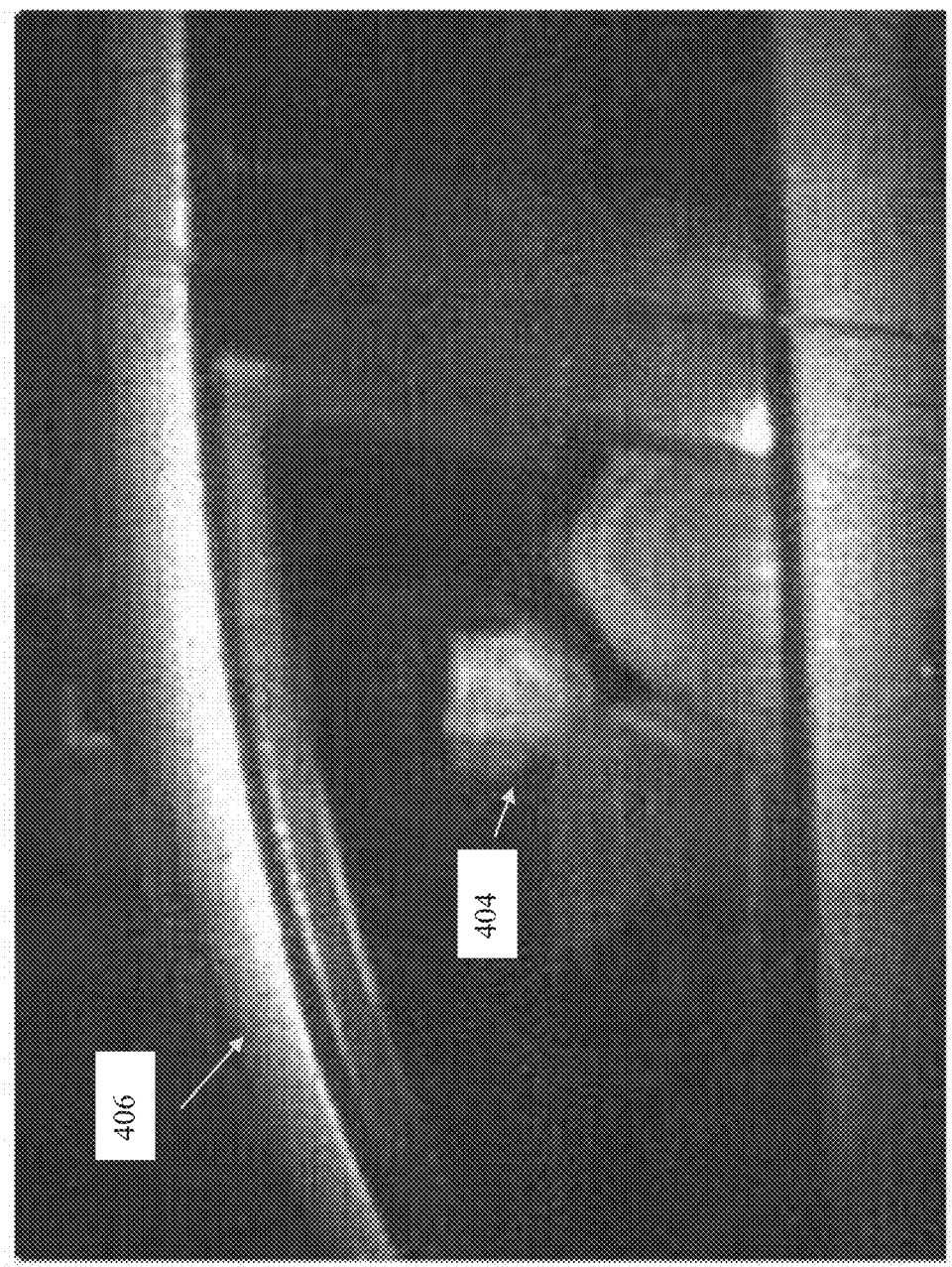
FIG. 4 is a schematic depicting a SWIR image generated by a SWIR sensor capturing filtered SWIR illumination generated by a SWIR illumination element, in accordance with some embodiments of the present invention.

Reference is now made to FIG. 4, which is a schematic depicting a SWIR image 402 generated by a SWIR sensor capturing filtered SWIR illumination generated by a SWIR illumination element, in accordance with some embodiments of the present invention. A face of a person 404 is located behind a reflective window that reflects solar radiation, and creates a glare and/or reflection when captured by a visible light sensor. In contrast, SWIR image 402 depicts the face of the person 404 even when located behind the reflective window, since SWIR image 402 excludes the reflective visible light and/or reflective solar radiation. Boundary 406 of window of the car may be detected, and used as a reference to find face 404 located within boundary 406. For example, for biometric validation of people in their cars, without requiring the person to lower their window.

Figure 5:
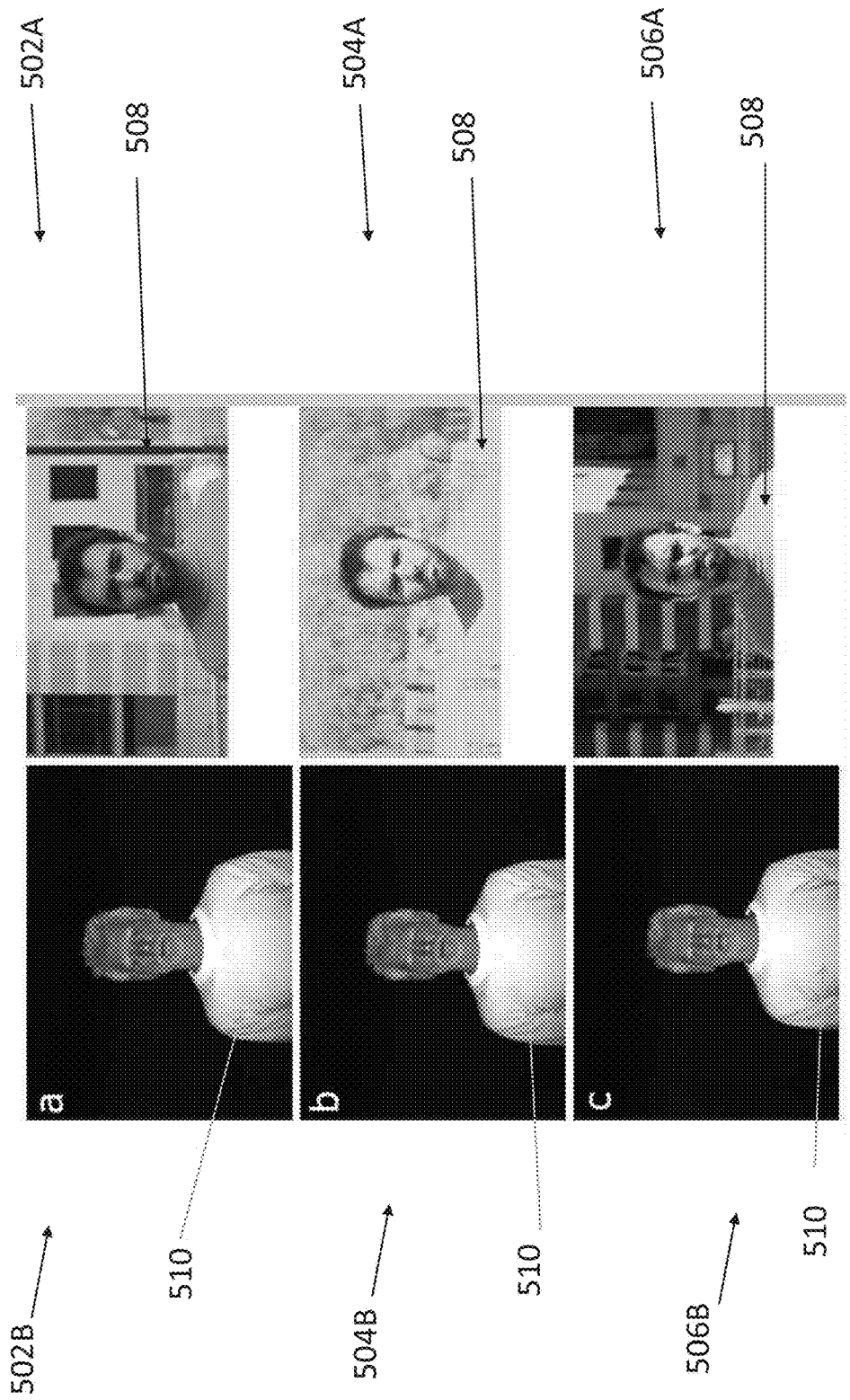
FIG. 5 includes image pairs of a person, taken using a standard visible light camera and a SWIR sensor at the solar blind range, in accordance with some embodiments of the present invention.

Reference is now made to FIG. 5, which includes image pairs of a person, taken using a standard visible light camera and a SWIR sensor at the solar blind range, in accordance with some embodiments of the present invention. Images 502A, 504A, and 506A depict a same person 508, taken under different visible light conditions using a standard visible light camera. Images 502B, 504B, and 506C depict person 510, which is the same as person 508, taken under the same visible light conditions as images 502A, 504A, and 506A, using a SWIR sensor at the solar blind range under SWIR illumination at the solar blind range.

The same person 508 appears different in images 502A, 504A, and 506A due to the different lighting conditions. The variability in the appearance of person 508 between images 502A, 504A, and 506A is large. Moreover, the background is clearly visible in image 502A, 504, and 506A. A simple comparison, such as comparing image 502A to image 504A, for example using standard approaches, would incorrectly identify person 508 of image 502A and person 508 of image 504A as two different people. Moreover, the background of the images may play a role in the error, for example, the bright reflection of the shirt of person 508 in 504A cannot be clearly distinguished from the nearby bright background. In contrast, person 510, which is the same as person 508, appears similar in images 502B, 504B, and 506B, even under different visible light conditions. Moreover, no background objects are depicted in images 502A, 504B, and 506B. A simple comparison, such as comparing image 502B to image 504B, for example using standard approaches, would correctly identify person 510 of image 502B and person 510 of image 504B as the same person.

Figure 6:
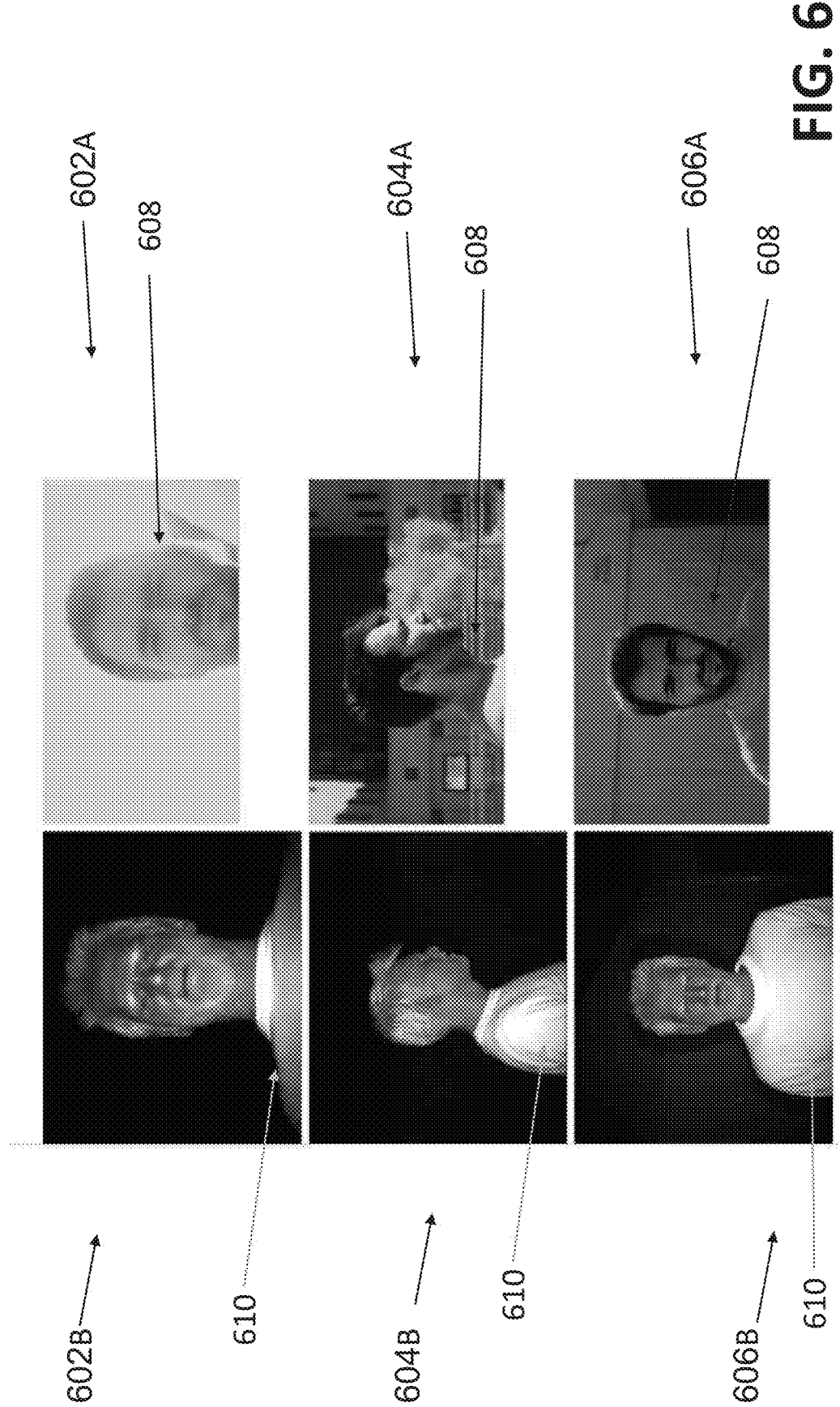
FIG. 6 includes another set of image pairs of a person, taken using a standard visible light camera and a SWIR sensor at the solar blind range, in accordance with some embodiments of the present invention.

Reference is now made to FIG. 6, which includes another set of image pairs of a person, taken using a standard visible light camera and a SWIR sensor at the solar blind range, in accordance with some embodiments of the present invention. Images 602A, 604A, and 606A are captured by a standard visible light camera, depicting the same person 608 (which is the same as person 508 depicted in FIG. 5) under different orientations and/or positions relative to the camera. Moreover, images 602A, 604A and 606A are captured under different visible light conditions. A simple comparison, such as comparing image 602A to image 604A, for example using standard approaches, would incorrectly identify person 508 of image 602A and person 508 of image 604A as two different people due to the different orientations and/or different light conditions.

Images 602B, 604B, and 606B are captured by a SWIR sensor at the solar blind range under SWIR illumination at the solar blind range. Images 602B, 604B, and 606B depict person 610 (which is the same as person 510 depicted in FIG. 5), which is the same as person 608, taken under the same orientations and/or positions relative to the SWIR sensor as in images 602A, 604A, and 606A. Person 610, which is the same as person 608, appears similar in images 602B, 604B, and 606B, even under different visible light conditions and/or different orientations. Moreover, no background objects are depicted in images 602A, 604B, and 606B. A simple comparison, such as comparing image 602B to image 604B, for example using standard approaches, would correctly identify person 610 of image 602B and person 610 of image 604B as the same person.

Figure 7:
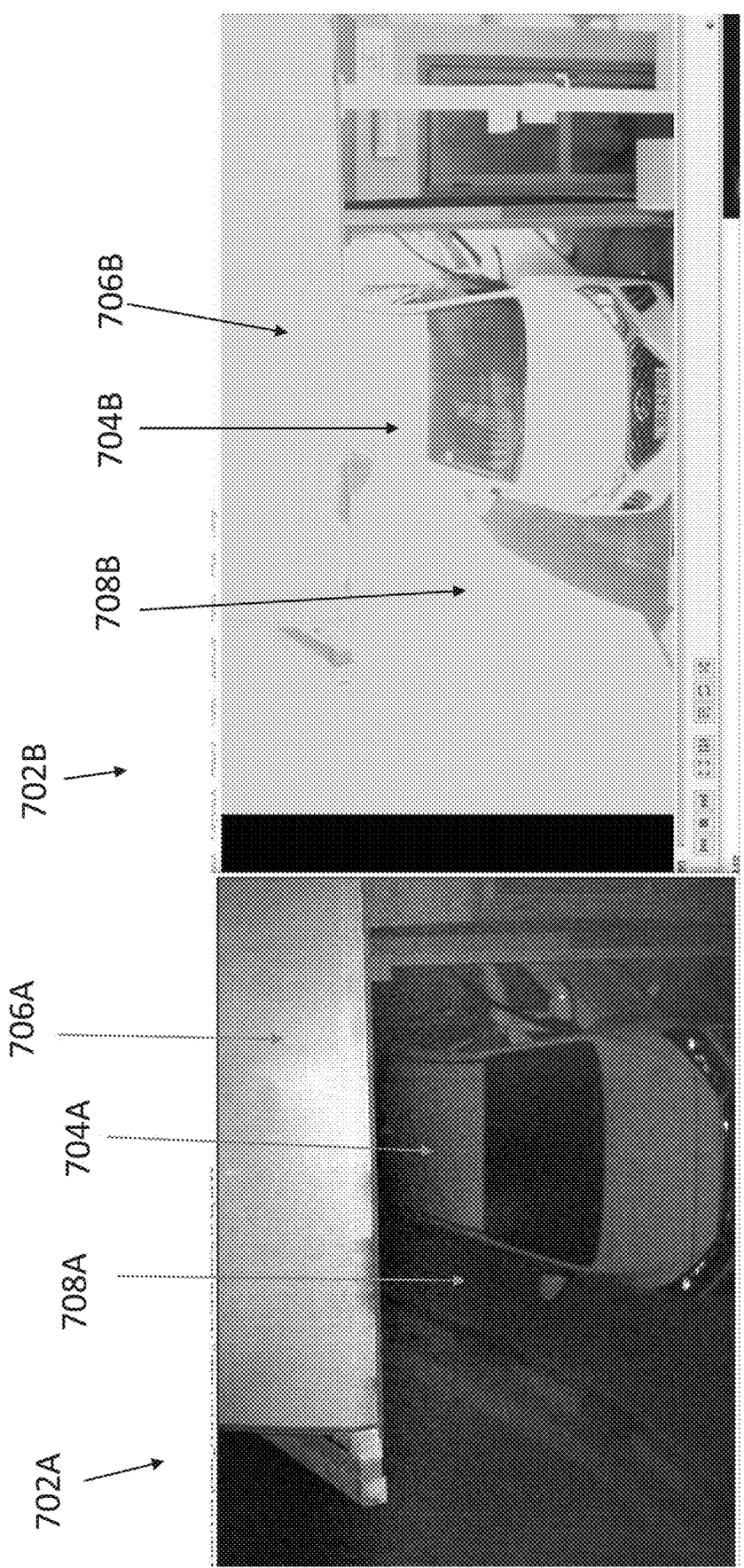
FIG. 7 is a SWIR image of a car and a corresponding visible light image of a car, in accordance with some embodiments of the present invention.

Reference is now made to FIG. 7, which is a SWIR image 702A of a car 704A and a corresponding visible light image 702B of a car 704B which is the same as car 704A, in accordance with some embodiments of the present invention. Car 704A is entering a parking lot. Image 702A of car 704A is captured by a SWIR sensor under SWIR illumination at the solar blind range. Car 704A is clearly distinguishable from other objects, such as an overhead structure 706A and road 708A. In contrast, image 702B depicts car 704B under strong sunlight. It is difficult to distinguish the border of car 704B from overhead structure 706B and/or road 708B, which appear similar in brightness to car 704B. The similarity in brightness creates a technical challenge for automatic segmentation processes and/or automatic processes that compare car 704B to a reference car.

Since cars enter the parking lot pass through a checkpoint, when SWIR sensor is fixed in position and/or orientation, the shape of each car depicted in the captured SWIR image is not expected to significantly change. This enables cars depicted in SWIR images to be segmented and/or directly compared to reference images depicting reference cars, for example, using machine vision approaches. An example security application is capturing a reference SWIR image of the reference car with reference license plate entering the parking lot, comparing a target SWIR image of a target car with target license plate exiting the parking lot to the reference SWIR image, and generating a security alert indicating a possible security breach when the target car matches the reference car, but the target license plate does not match the reference license plate, or when the target license plate matches the reference license plate but the target car does not match the target car. Such security breach may occur, for example, when malicious entities change license plates on their car, or steal another car from the parking lot and place the original license plate on the other car.

Figure 8:
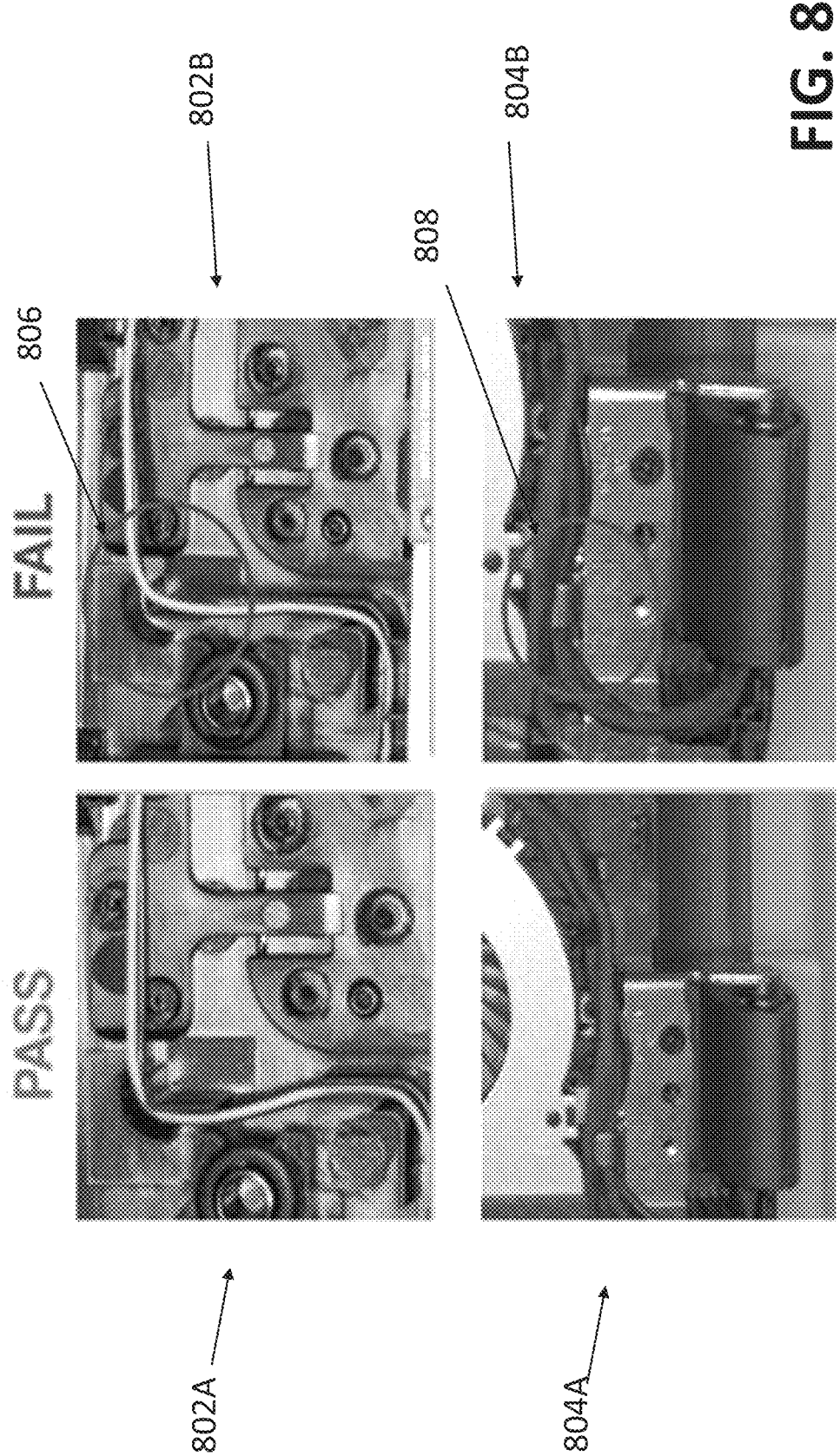
FIG. 8 includes pairs of SWIR images depicting components that passes an automated machine vision based inspection, and components that failed the inspection, in accordance with some embodiments of the present invention.

Reference is now made to FIG. 8, which includes pairs of SWIR images 802A-B and 804A-B depicting components that passes an automated machine vision based inspection, and components that failed the inspection, in accordance with some embodiments of the present invention. Components may be, for example, manufactured and/or assembled, automatically (e.g., by robots) and/or manually. The SWIR images 802A-B and 804A-B are captured under SWIR illumination at the solar blind range. The SWIR images 802A-B and 804A-B use the solar blind range, which eliminates glare and/or other light induced artifacts. This improves the ability of the automated machine vision based inspection systems to detect errors, for example, by comparing the target components to reference components. For example, a circle 806 is drawn on image 802B indicating an error in positioning of a wire, and a circle 808 is drawn on image 804B indicating an error in positioning of another wire. Indication of errors may be generated, and/or may trigger an automated action, such as removal of the component from further manufacturing and/or from packaging.

Figure 9:
FIG. 9 is a schematic of a user interface of an automatic machine vision based system that inspects components by analyzing SWIR images under SWIR illumination at the solar blind range, in accordance with some embodiments of the present invention.

Reference is now made to FIG. 9, which is a schematic of a user interface 902 of an automatic machine vision based system that inspects components by analyzing SWIR images under SWIR illumination at the solar blind range, in accordance with some embodiments of the present invention. The automatic machine vision based system compares target components depicted in the SWIR images to reference components depicted in SWIR image to detect non-similarities, indicating an error and/or a failure in the quality inspection. A similar match between the target components and reference components indicates a pass of the quality inspection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant SWIR sensors, SWIR illumination elements, and filters will be developed and the scope of the terms SWIR sensors, SWIR illumination elements, and filters are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for imaging of a scene, comprising:
   at least one short wave infrared (SWIR) illumination element that generates SWIR illumination at a SWIR wavelength range;
   at least one filter that filters out electromagnetic radiation at wavelengths which are mostly non-absorbed by water vapor in air depicted in the scene;
   at least one SWIR sensor that captures the SWIR illumination of the SWIR wavelength range which is passed by the at least one filter and generates at least one SWIR image of the scene; and
   a non-transitory medium storing program instructions, which, when executed by a processor, cause the processor to analyze the at least one SWIR image to compare a target object depicted in the SWIR image to a reference object depicted in a reference image, and output an indication of whether the target object matches the reference object; and
   at least one of a-d, where:
   a) wherein the target object comprises clothing and/or accessories worn by a subject, and the comparison comprises a re-identification that the clothing and/or accessories matches a reference clothing and/or accessories of the subject;
   b) wherein said system further comprising a location sensor that generates an indication of a location, and wherein compare comprising compare the target object with a target location generated by the location sensor to the reference object associated with a reference location;
   c) further comprising adapting a position and/or orientation of the target object to obtain an adapted target object, and comparing the adapted target object to the reference object; and
   d) wherein the reference object comprises a reference vehicle with a reference license plate detected from a reference SWIR image, and compare comprises comparing a target vehicle with a target license plate from a target SWIR image obtained after the reference SWIR image, and the indication is generated when at least one of: (i) the target license plate matches the reference license plate and when the target vehicle is a mismatch with the reference vehicle, and (ii) the target license plate does not match the reference license plate and when the target vehicle matches the reference vehicle.

2. The system of claim 1, wherein the at least one filter comprises a spectral narrow pass-band filter that passes wavelengths of about 1350-1450 nanometers (nm) and excludes wavelengths over about 1450 nm and below about 1350 nm.

3. The system of claim 1, wherein the at least one filter comprises a spectral narrow pass-band filter that passes wavelengths of about 1360 nm-1380 nm and excludes wavelengths over about 1380 nm and below about 1360 nm.

4. The system of claim 1, wherein the target object comprises a part of a human body, and the comparison comprises a biometric verification that the target part of the human body matches a reference part of the human body.

5. The system of claim 1, wherein the target object comprises clothing and/or accessories worn by a subject, and the comparison comprises a re-identification that the clothing and/or accessories matches a reference clothing and/or accessories of the subject.

6. The system of claim 1, further comprising a location sensor that generates an indication of a location, and wherein compare comprising compare the target object with a target location generated by the location sensor to the reference object associated with a reference location.

7. The system of claim 1, further comprising when the target object is a mismatch with the reference object, detecting at least one mismatch between the target object and the reference object, and providing an indication of at least one region of the target object depicting the at least one mismatch.

8. The system of claim 1, further comprising adapting a position and/or orientation of the target object to obtain an adapted target object, and comparing the adapted target object to the reference object.

9. The system of claim 1, wherein the reference object comprises a reference vehicle with a reference license plate detected from a reference SWIR image, and compare comprises comparing a target vehicle with a target license plate from a target SWIR image obtained after the reference SWIR image, and the indication is generated when at least one of: (i) the target license plate matches the reference license plate and when the target vehicle is a mismatch with the reference vehicle, and (ii) the target license plate does not match the reference license plate and when the target vehicle matches the reference vehicle.

10. A system for imaging of a scene, comprising:
at least one short wave infrared (SWIR) illumination element that generates SWIR illumination at a SWIR wavelength range;
at least one filter that filters out electromagnetic radiation at wavelengths which are mostly non-absorbed by water vapor in air depicted in the scene;
at least one SWIR sensor that captures the SWIR illumination of the SWIR wavelength range which is passed by the at least one filter and generates at least one SWIR image of the scene; and
a non-transitory medium storing program instructions, which, when executed by a processor, cause the processor to at least one of a) and b), where:
a) feed the at least one SWIR image of the scene into at least one of a virtual reality and augmented reality process that computes at least one of a virtual reality scene and an augmented reality scene based on the at least one SWIR image, wherein at least one of: the virtual reality scene is computed based on relative head motion and/or distance computed based on an analysis of objects depicted in the at least one SWIR image, and the augmented reality process generates an overlay for presentation over the at least one SWIR image; and b) feed the at least one SWIR image of the scene into a navigation controller that controls autonomous navigation of a vehicle according to an analysis of objects depicted in the at least one SWIR image.

11. The system of claim 1, wherein the at least one SWIR sensor is positioned in proximity to a reflective surface in the scene that creates glare by reflecting electromagnetic radiation comprising solar radiation from a sun, wherein the at least one SWIR sensor captures an image that excludes the glare.

12. The system of claim 1, wherein the at least one filter passes solar radiation at wavelengths which are mostly absorbed by water vapor in air depicted in the scene.

13. The system of claim 12, wherein the at least one filter passes electromagnetic radiation at wavelengths which are at least about 95% absorbed by water vapor in air.

14. The system of claim 1, wherein the SWIR wavelength range includes at least a wavelength band passed by the at least one filter.

15. The system of claim 1, wherein an image of a scene that is non-illuminated by the at least one SWIR illumination element and illuminated by solar radiation from a sun, appears mostly dark when captured by an imaging sensor of electromagnetic radiation passed by the at least one filter.

16. The system of claim 1, wherein the at least one filter is positioned at least one of: in a field of view of the at least one SWIR sensor, and in a field of illumination of the at least one SWIR illumination element.

17. The system of claim 1, wherein the at least one SWIR sensor captures the at least one SWIR image at a quality level above a threshold and a visible light sensor substituted for the at least one SWIR sensor captures at least one visible light image using visible light at a quality level below the threshold.

18. The system of claim 17, wherein the quality level denotes at least one member of the group consisting of: a signal to noise ratio, illumination level of pixels, absence of glare, and an accuracy of automatically identifying a feature depicted in the at least one SWIR image, the feature selected from the group consisting of: a face, a person, a pose, a gesture, a measurement of a body of a person, and an object used for vehicle navigation.

19. The system of claim 10, wherein at least one of: the virtual reality scene is computed based on relative head motion and/or distance computed based on an analysis of objects depicted in the at least one SWIR image, and the augmented reality process generates an overlay for presentation over the at least one SWIR image.

20. The system of claim 10, wherein said program instructions cause said processor, when executing said program instructions to feed the at least one SWIR image of the scene into the navigation controller that controls autonomous navigation of the vehicle according to the analysis of objects depicted in the at least one SWIR image.

21. The system of claim 20, wherein analysis of the objects depicted in the at least one SWIR is performed independently of the time of day, and excludes analysis based on other external light sources.

22. A system for imaging of a scene, comprising:
at least one short wave infrared (SWIR) illumination element that generates SWIR illumination at a SWIR wavelength range;
at least one filter that filters out electromagnetic radiation at wavelengths which are mostly non-absorbed by water vapor in air depicted in the scene;
at least one SWIR sensor that captures the SWIR illumination of the SWIR wavelength range which is passed by the at least one filter and generates at least one SWIR image of the scene; and a non-transitory medium storing program instructions, which, when executed by a processor, cause the processor to: analyze the at least one SWIR image for biometric detection of at least one feature depicted within the respective SWIR image, the biometric detection selected from the group consisting of: a face, a person, a pose, a gesture, and a measurement of a body of a person;

wherein the processor executing the code instructions fails to recognize the at least one feature depicting within at least one visible light image captured by a visible light sensor substituted for the at least one SWIR sensor;

wherein the at least one feature depicted within the respective SWIR image is located behind a reflective surface that reflects solar radiation that creates a glare when captured by a visible light sensor substituted for the at least one SWIR sensor; and wherein the reflective surface comprises a window of a car, and wherein the processor executing the code instructions further analyzes the at least one SWIR image for detecting a boundary of a frame of the window of the car, and recognizing the at least one feature within the boundary of the frame.

23. The system of claim 22, wherein the at least one feature is detected by at least one of:
   (i) feeding the at least one SWIR image into a machine learning model trained on a training dataset of records, each record including a respective SWIR image generated by applying a transformation operation for converting a visible light image depicting a respective feature to a SWIR image depicting the respective feature, labelled with a ground truth label indicating the respective feature, and
   (ii) applying a transformation operation to the respective SWIR image for converting the respective SWIR image to a visible light image, and feeding the converted visible light image into a machine learning model trained on a training dataset of records, each record including a visible light image depicting a respective feature, labelled with a ground truth label indicating the respective feature.

24. A method of imaging of a scene with glare, comprising:
   generating SWIR illumination at a SWIR wavelength range;
   filtering out electromagnetic radiation at wavelengths which are mostly non-absorbed by water vapor in air depicted in the scene;
   capturing the SWIR illumination of the SWIR wavelength range which is passed by the filtering;
   generating at least one SWIR image of the scene from the captured SWIR illumination;
   analyzing the at least one SWIR image to compare a target object depicted in the SWIR image to a reference object depicted in a reference image, and output an indication of whether the target object matches the reference object; and
   at least one of a-d, where:
   a) wherein the target object comprises clothing and/or accessories worn by a subject, and the comparison comprises a re-identification that the clothing and/or accessories matches a reference clothing and/or accessories of the subject;
   b) wherein said system further comprising a location sensor that generates an indication of a location, and wherein compare comprising compare the target object with a target location generated by the location sensor to the reference object associated with a reference location;
   c) further comprising adapting a position and/or orientation of the target object to obtain an adapted target object, and comparing the adapted target object to the reference object; and
   d) wherein the reference object comprises a reference vehicle with a reference license plate detected from a reference SWIR image, and compare comprises comparing a target vehicle with a target license plate from a target SWIR image obtained after the reference SWIR image, and the indication is generated when at least one of: (i) the target license plate matches the reference license plate and when the target vehicle is a mismatch with the reference vehicle, and (ii) the target license plate does not match the reference license plate and when the target vehicle matches the reference vehicle.

* * * * *